United States Patent [19]

Plaisted

[11] 4,019,630
[45] Apr. 26, 1977

[54] CARTRIDGE CONTAINING A SELF-SETTING COMPOSITION

[75] Inventor: Anthony Cecil Plaisted, North Royalton, Ohio

[73] Assignee: Fosroc A.G., Zug, Switzerland

[22] Filed: July 28, 1975

[21] Appl. No.: 599,496

[52] U.S. Cl. .............................. 206/219; 61/45 B; 206/223; 229/56; 259/54
[51] Int. Cl.² .................. B65D 25/08; B65D 31/12
[58] Field of Search .................. 206/219, 221, 223; 220/23; 61/45 B; 229/56

[56] References Cited

UNITED STATES PATENTS

| 2,609,880 | 9/1952 | Dyer | 206/219 |
|---|---|---|---|
| 2,965,496 | 12/1960 | Serdar | 220/23 |
| 3,756,388 | 9/1973 | Murphy | 206/219 |
| 3,861,522 | 1/1975 | Llewellyn | 206/219 |

FOREIGN PATENTS OR APPLICATIONS

| 473,305 | 7/1969 | France | 206/219 |
|---|---|---|---|
| 2,082,713 | 11/1971 | France | 206/219 |

Primary Examiner—William Price
Assistant Examiner—Bruce H. Bernstein
Attorney, Agent, or Firm—Caesar, Rivise, Bernstein & Cohen, Ltd.

[57] ABSTRACT

A cartridge containing a two component, self-setting composition. The cartridge comprises a tube formed of a flexible, rupturable material and having a first component of said composition sealed therein. A depression is formed in said tube with said depression being filled with a second component of said composition. The second component is sealed within the depression by sealing means. In one embodiment of the invention the sealing means comprises a strip of tape having an adhesive thereon. In another embodiment the sealing means comprises the joint formed between portions of the tube contiguous with the sides of the depression. In another embodiment the sealing means comprises a flap. The flap is created when said tube is formed by rolling up a strip of said rupturable material having two side portions wherein one side portion of the strip is sealed to the free edge of the other side portion and leaving a margin defining said flap. The flap is disposed over the filled depression and is sealed in place.

4 Claims, 5 Drawing Figures

CARTRIDGE CONTAINING A SELF-SETTING COMPOSITION

The invention concerns generally improved self-setting mix cartridges and the method of making said cartridges.

The invention relates to a cartridge containing a self-setting composition, and preferably for use in securing a fixing element in a substrate, for example an anchor bolt in a mine wall or roof. There have been numerous proposals to provide cartridges containing preproportioned quantities of the components of a self-setting mix packaged in such a way that they do not interact until the cartridge is destroyed by the element to be fixed. Two such cartridges have been disclosed in patent Application Ser. No. 371,653, filed June 19, 1973 and patent Application Ser. No. 514,515, filed Oct. 15, 1974, the disclosures of which are incorporated by reference herein.

According to the invention, a cartridge containing the interactive components of a self-setting composition comprises a tube of flexible plastics material, the tube being sealed at each end and being substantially filled with a first interactive component, the wall of the tube being depressed inwardly to define a depression in the filled tube, the depression extending longitudinally of the cartridge, a second interactive component being contained within the depression sealing means sealing the mouth of the depression.

Preferably the depression is formed by depressing one portion of the wall of the flexible tube inwardly towards the facing wall portion beyond the center of the tube so ensuring that when the cartridge is destroyed by rotating a fixing element through the cartridge sufficient of both components is intermixed to form a secure anchorage.

Most preferably, one component, the major one, comprises a paste of a filler and a hardenable resin such as an unsaturated polyester resin, and is located within the tube, and the second component comprises a paste of a filler and a hardener for the resin, and is contained within the depression. In the case of an unsaturated polyester resin the hardener will typically include a peroxide such as benzoyl peroxide which can be hazardous and in this case the mouth of the depression must be sealed.

In one embodiment of the invention the mouth of the depression is sealed by an overlying longitudinal strip of adhesive tape which is adhered to the exterior surface of the tube on each side of the depression. Preferably the adhesion is done by heat sealing.

In another embodiment the edge portions of the tube wall defining the sides of the depression are joined together by heat sealing to seal the mouth of the depression, so saving the need for a sealing tape or flap.

In another arrangement the tube is formed by rolling up a film of plastics material and heat sealing one longer side portion of the film adjacent the free edge of the other side portion leaving a margin which may be a flap to be sealed across the mouth of the depression.

A cartridge of the invention may be made industrially in many ways. In one preferred way of making cartridges on a continuous basis, the tube is filled with the major component following which the depression is formed in the tube and the mouth of the depression is sealed. In another method the depression is first formed and filled with its component and then sealed, following which the tube is filled with the major component. These actions may be done to continuous tube from which is then separated individual cartridges.

Materials which can be used as the films and the interactive components are as indicated in the above mentioned patent applications.

One embodiment of cartridge of the invention and a method of manufacture is shown in the accompanying diagrammatic drawings in which.

Figure 1:
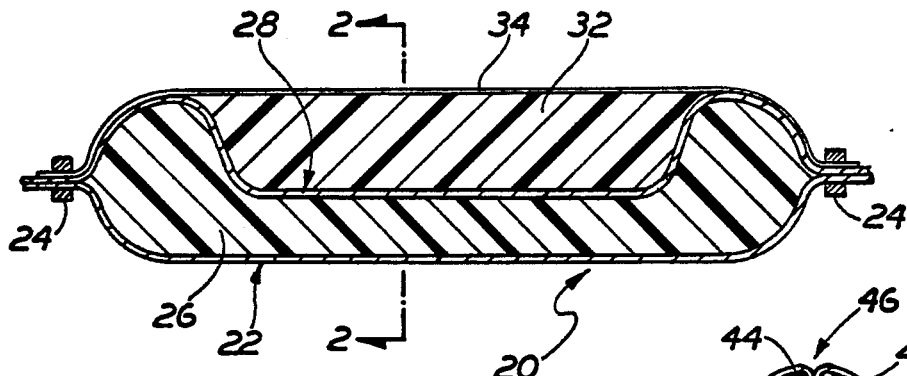
FIG. 1 is a longitudinally median sectional view of a cartridge in accordance with one embodiment of this invention.

Referring now to the various figures of the drawing wherein like reference numerals refer to like parts, there is shown in FIG. 1 an improved cartridge 20 of a self-setting mix in accordance with this invention.

The cartridge 20 comprises a tube 22 of a rupturable plastics film, preferably a saturated polyester, sealed at end by means of a metal clip 24. The body of the tube is filled to generally circular cross sectional shape with a mixture 26 of unsaturated polyester, filler and accelerator. At its upper side, the wall of the filled tube 22 is pushed inwardly to define a depression 28 which extends from the upper side 30 (FIG. 2) of the tube substantially into the body thereof. The depression is filled with a hardener mixture 32 of a peroxide (such as benzoyl peroxide) and filler. A length of adhesive tape 34 (such as Melinex) on the bottom side of which is a coating of silicone polymer adhesive (not shown), extends over the upper surface 30 of the cartridge tube and is secured to portions of the tube contiguous with the depression to seal the mouth of the depression 28 and at each end of the cartridge the tape is trapped in the metal clip 24. The silicone of the tape is inert to the hardener mixture.

Figure 2:
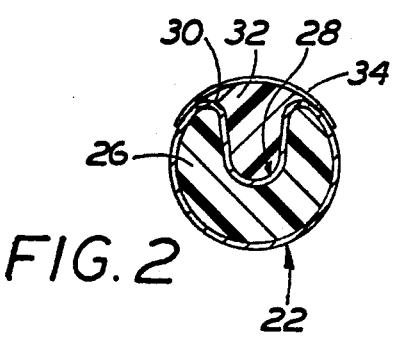
FIG. 2 is a cross sectional view taken along line 2—2 of FIG. 1.
Figure 3:
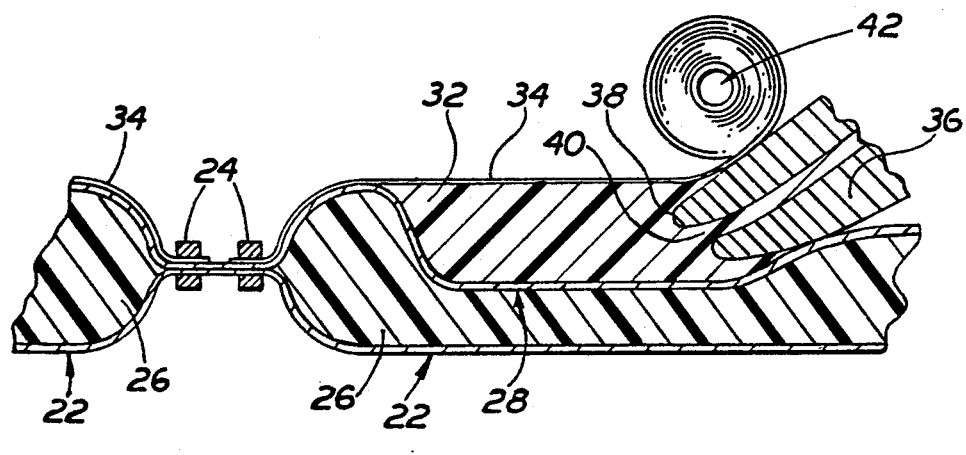
FIG. 3 is a longitudinal view in section showing a stage of manufacture of the cartridge on a continuous basis.

A method of maing a cartridge according to FIGS. 1 and 2 from continuous lay flat plastics tube is shown diagrammatically in FIG. 3. The tube is filled with an unsaturated polyester composition from an extrusion machine (not shown).

The filled tube 22 is then passed under a shoe 36 having at its toe 38 an opening 40 through which is passed the hardener paste 32. Immediately in front of the toe 38 is a roll 42 of adhesive tape 34. The tube is continuously passed below the shoe and roll. The shoe makes the depression 28 in the upper side of the filled tube. The hardener paste 32 is fed into the depression so formed and tape is wound off the strip 42 immediately and covers the filled depression. At further stations and in known manner the tube is voided and clips 24 are applied to close off individual cartridge lengths following which the leading cartridge length is parted from the parent tube to define an individual cartridge.

Figure 4:
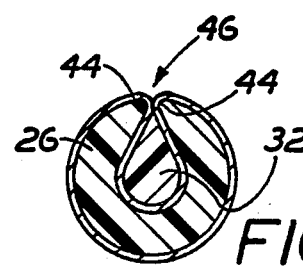
FIG. 4 is a cross sectional view of another cartridge of this invention.

In the embodiment of FIG. 4 edge portions 44 of the tube 22 contiguous with the depression 28 on the sides thereof are joined together at joint 46 by heat sealing to seal the mouth of the depression 28 and to enclose the hardener paste 32 therein.

Figure 5:
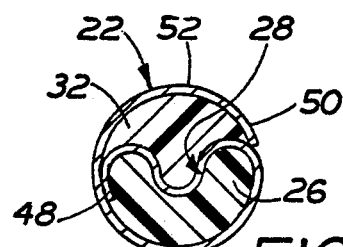
FIG. 5 is a cross sectional view of yet another cartridge.

In the embodiment shown in FIG. 5 the tube 22 is formed by rolling up a strip of plastics material having a pair of side edge portions 48 and 50 to form the tube 22. The tube is closed by heat sealing side edge 48 to the free edge of the other side portion 50 but leaving a margin 52 which defines a flap. The flap 52 is disposed over the depression 28 having the hardener paste 32 therein. The free edge 50 of the flap is then heat sealed to the tube to seal the hardener paste in place.

Without further elaboration the foregoing will so fully illustrate my invention, that others may, by applying current or future knowledge, readily adapt the same for use under various conditions of service.

What is claimed as the invention is:

1. A cartridge of a two component, interactive, self-setting composition, comprising a tube of a flexible, rupturable material sealed at each end and having a first interactive component of said composition sealed therein, the wall of said tube being depressed inwardly toward the facing wall portion beyond the center of the tube to form a depression in the filled tube, said depression extending substantially toward each end of said tube and being filled with the second interactive component of said composition, said filled depression extending continuously from the outer surface of said tube past the center of said tube, with the portion of said tubing forming said depression serving as a barrier wall precluding the interaction of said components and sealing means sealing said second component within said depression.

2. The cartridge of claim 1 wherein the sealing means comprises a strip of tape disposed over said filled depression and secured to the tube at portions thereof contiguous with said depression.

3. The cartridge of claim 2 wherein said tape includes a heat activated adhesive.

4. The cartridge of claim 1 wherein said sealing means comprises a joint formed between portions of said tube contiguous with the sides of the depression.

* * * * *